United States Patent [19]
Akita et al.

[11] 4,080,828
[45] Mar. 28, 1978

[54] LIQUID LEVEL DETECTING APPARATUS

[75] Inventors: Sigeyuki Akita, Aichi; Shuzo Yoshida, Chiryu, both of Japan

[73] Assignee: Nippon Soken, Inc., Nishio, Japan

[21] Appl. No.: 778,583

[22] Filed: Mar. 17, 1977

[30] Foreign Application Priority Data

Apr. 21, 1976 Japan .................................. 51-45993
Apr. 21, 1976 Japan .................................. 51-45994

[51] Int. Cl.$^2$ ............................................ G01F 23/26
[52] U.S. Cl. ........................................ 73/308; 73/313; 340/244 R
[58] Field of Search ............. 73/311, 313, 308, 290 R, 73/290 V; 340/244 A

[56] References Cited

U.S. PATENT DOCUMENTS

4,006,637  2/1977  Kinosita ................................ 73/313

FOREIGN PATENT DOCUMENTS

2,210,298  3/1973  Germany ................................ 73/308
811,417   4/1959  United Kingdom .................... 73/308

*Primary Examiner*—Richard C. Queisser
*Assistant Examiner*—Joseph W. Roskos
*Attorney, Agent, or Firm*—Cushman, Darby & Cushman

[57] ABSTRACT

The oscillation frequency of the output signal of a ring oscillator is changed in response to a change in the relative position between the coil in the ring oscillator and a float including a conductive member and vertically movable in accordance with changes in the level of a liquid to be measured. The amount of electric power consumed by the ring oscillator itself is changed in accordance with changes in the oscillation frequency of the oscillator output signal. The power consumption of the ring oscillator is detected in accordance with the voltage across a resistor inserted in the power line from the electric power source to the ring oscillator, so that when this voltage attains a predetermined value, an indicator designed to indicate that the liquid level has attained a predetermined level is brought into operation.

5 Claims, 11 Drawing Figures

LIQUID LEVEL DETECTING APPARATUS

BACKGROUND OF THE INVENTION

1. Field of the Invention

The present invention relates to a liquid level detecting apparatus for detecting that the level of a liquid has attained a predetermined level.

2. Description of the Prior Art

An apparatus of the above type is known in the art in which the level of a liquid to be measured is detected by means of a float including a magnet and one or more reed switches which are opened and closed by the magnet. However, this conventional detecting method requires the use of a magnet having a sufficient magnetic force for opening and closing the reed switches and a float of a size sufficient to provide the required buoyancy to float the magnet. Particularly, this detecting method is disadvantageous in that since this method utilizes the magnetic attractive force which acts between the reed switches and the magnet, it is nearly impossible to realize the reduction in the size and weight of the apparatus.

Japanese Utility Model Laid-Open (publication) No. 50-31961 discloses a liquid level sensor employing an oscillator circuit. More specifically, the sensor comprises an oscillator circuit, a guide rod accommodating therein the oscillator coil of the oscillator circuit and a float movable along the guide rod in accordance with the liquid level, and the secondary winding of the oscillator coil consisting of a short-circuit conductor is provided on the float, thereby permitting the detection of the level of liquid. While this device has many advantages, it is also disadvantageous in that since the presence of the output signal of the oscillator circuit produced by the movement of the float is discriminated in accordance with the signal rectified by a rectifier circuit including, for example, a capacitor, diodes, resistor, etc., the number of component parts used in the device is increased.

SUMMARY OF THE INVENTION

The present invention has been made to overcome the foregoing deficiencies of the prior art devices.

It is, therefore, the object of the invention to provide an improved liquid level detecting apparatus of the type including an oscillator circuit whose oscillation frequency is varied in accordance with variation in the level of liquid, wherein the liquid level is detected in accordance with variation in the electric power consumption of the oscillator circuit itself.

DESCRIPTION OF THE PREFERRED EMBODIMENTS

The present invention will now be described in greater detail with reference to the illustrated embodiments.

Figure 1:
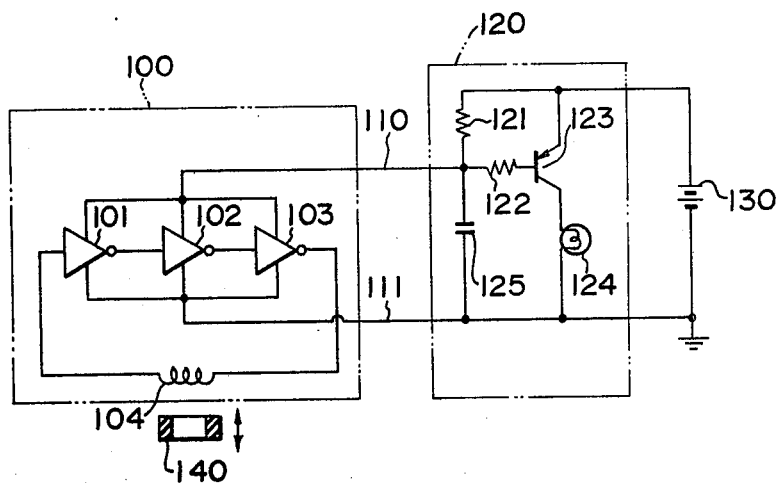
FIG. 1 is a wiring diagram showing an embodiment of the present invention.
Figure 2:
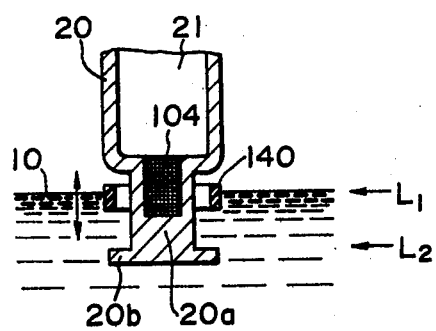
FIG. 2 is a sectional view showing the part of the apparatus of FIG. 1 which serves the liquid level detecting function.
Figure 3:
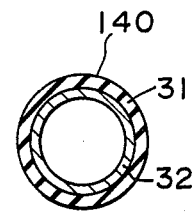
FIG. 3 is a sectional view showing the construction of the float usable in the apparatus provided in accordance with the invention.

Referring first to FIG. 1, there is illustrated a circuit diagram for an embodiment of the liquid level detecting apparatus according to the invention. In the Figure, numeral 100 designates a ring oscillator comprising three inverter gates 101, 102 and 103 and a coil 104, 110 and 111 power lines for supplying electric power to the inverter gates 101, 102 and 103, 120 a switching circuit for detecting variation in the electric power consumption of the ring oscillator 100. The switching circuit 120 comprises resistors 121 and 122, a transistor 123, a capacitor 125 and a lamp 124. Numeral 130 designates a d.c. electric power source and 140 a float having a conductive ring member and movable in accordance with variation in the level of a liquid to be measured. Referring to FIG. 2 illustrating a sectional view of the liquid level detecting part of the embodiment shown in FIG. 1, a support 20a which is integral with a housing 20 is extended through the float 140, and the float 140 is movable in the directions of the arrows in accordance with variation in the level of a liquid 10 to be measured. The float 140 is prevented from coming off the support 20a by means of a stopper 20b. Numeral 21 designates a detector circuit section, 104 the coil constituting a component element of the ring oscillator 100. FIG. 3 shows the construction of the float 140. In the Figure, the float 140 includes a float body portion 31 of nonconductive material and a ring member 32 of conductive material is provided on the inner periphery of the body portion 31.

Figure 4A:
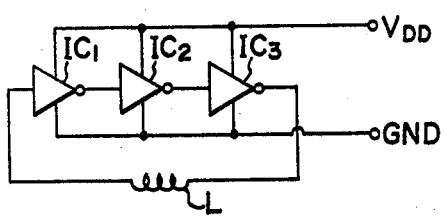
FIGS. 4A, 4B and 4C are circuit diagrams useful for explaining the operation of the apparatus provided in accordance with the invention.
Figure 4B:
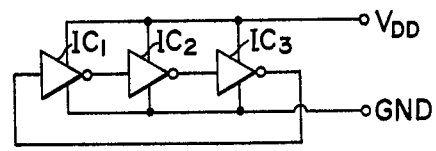

With the construction described above, the operation of this embodiment will now be described. In the condition where the liquid 10 is at a level $L_1$ as shown in FIG. 2, the ring member 32 of the float 140 surrounds the coil 104 which is the component element of the ring oscillator 100. Consequently, the magnetic coupling between the float 140 and the coil 104 is changed, with the result that the self-inductive electromotive force induced in the coil 104 is absorbed by the conductive ring member 32 provided on the float 140, and the ring oscillator 100 including the coil 104 and shown in FIG. 1 (and FIG. 4A) now becomes equivalent to the ordinary ring oscillator wherein the input of an inverter gate $IC_1$ and the output of an inverter gate $IC_3$ are short-circuited as shown in FIG. 4B. In this case, the resulting oscillation frequency $f_1$ is given as $f_1 \simeq \frac{1}{3} \tau$ (where $\tau$ is the delay time in the signal transmission speed of each inverter gate). Each of the inverter gates 101, 102 and 103 used in this embodiment comprises the known RCA COS/MOS IC CD4069B and the oscillation frequency $f_1$ is about 6,000 kHz.

Figure 4C:
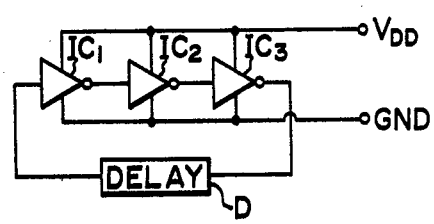

When the level of the liquid 10 drops to a level $L_2$, the float 140 is moved away from the coil 104 and the magnetic coupling therebetween is changed. Consequently, the self-inductive electromotive force induced in the coil 104 is no longer absorbed by the ring member 32 and the ring oscillator 100 including the coil 104 and shown in FIG. 1 becomes equivalent to one in which the input of the inverter gate $IC_1$ is connected to the output of the inverter gate $IC_3$ through a delay circuit D as shown in FIG. 4C. The delay circuit D of AG, 4C is the substitution of the coil L of FIG. 4A. In this case, the resulting oscillation frequency $f_2$ is given as $f_2 \approx 1/(3\tau + t)$ (where $t$ is the delay time due to the self-inductive action of the coil 104). In the case of the present embodiment, the oscillation frequency $f_2$ is about 300 kHz.

Figure 5:
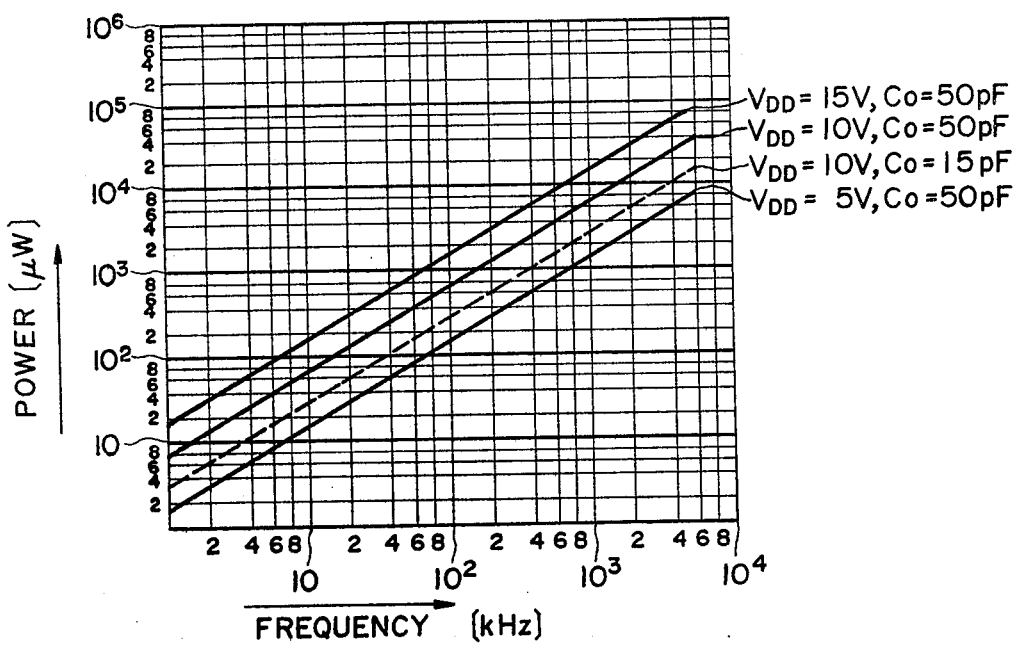
FIG. 5 is a frequency-to-power characteristic chart useful for explaining the operation of the apparatus according to the invention.

It is known well that the relationship between the power consumption and the input frequency of the COS/MOS IC shows such characteristics as shown in FIG. 5. It is thus evident that if the oscillation frequency changes considerably as in the case of the present embodiment, the power consumption of the ring oscillator 100 also changes considerably. Thus, in the case of this embodiment, in accordance with the changes in the oscillation frequency of the ring oscillator 100 corresponding to the liquid levels $L_1$ and $L_2$ of the liquid 10, the ratio between the resulting power consumptions $i_1$ and $i_2$ is given as $i_1 : i_2 = 10 : 1$.

Consequently, when the liquid 10 is at the level $L_1$, a large current flows through the power line 110 of the ring oscillator 100 shown in FIG. 1 so that the transistor 123 of the switching circuit 120 is turned on and the lamp 124 is also turned on, whereas when the liquid level is at the level $L_2$, only a small current flows through the power line 110 of the ring oscillator 100 so that the transistor 123 is turned off and the lamp 124 is also turned off, thus properly indicating the level of the liquid 10.

FIG. 5, which was quoted from the RCA COS/MOS IC Selection Guide/Data/Application Notes, 1975, shows that the power consumption P increases sharply with increase in the oscillation frequency and the data show the curves for different values of the supply voltage $V_{DD}$ and capacitor load $C_O$.

Further, while, in the embodiment described above, the ring oscillator 100 comprises the three inverter gates 101, 102 and 103, it is only necessary to use an odd number of inverter gates and moreover the type of the inverter gate used is not limited to the COS/MOS integrated circuit, namely, any type of integrated circuit may be used provided that its power consumption is dependent on the input frequency.

Still further, while, in the above-described embodiment, only the liquid level of the liquid 10 is detected, it is possible to predetermine the specific gravity of the float 140 so that the float 140 is caused to rise and fall in accordance with variations in the specific gravity of the liquid 10 and thereby detect the specific gravity of the liquid 10, too.

Still further, while the conductive ring member 32 is provided on the inner periphery of the float 140, the ring member 32 may be provided on the outer periphery or outer surface of the float 140, or alternately the ring member 32 may be replaced with any other member provided that it establishes a magnetic coupling between the float 140 and the coil 104 in response to the movement of the float 140.

Next, the second embodiment of the invention shown in FIG. 6 will be described. This embodiment incorporates a plurality of ring oscillators each thereof having a coil, whereby changes in the level of a liquid to be measured are detected at a plurality of different liquid levels.

In the Figure, numeral 200 designates a detector circuit section whereby the position of a float 140 which is movable in response to changes in the level of a liquid to be measured is detected in the form of a voltage variation, 250 an indicator circuit section for detecting and indicating the position of the float 140. In the detector circuit section 200, numerals 210, 220 and 230 designate ring oscillators which are identical in construction with the ring oscillator 100 used in the first embodiment of FIG. 1 except that the ring oscillators 220 and 230 are respectively connected to a power source 130 through resistors 241 and 242 having different resistance values. The power input terminal of the ring oscillator 210 and one ends of the resistors 241 and 242 are connected to the positive terminal of the power source 130 through a resistor 251 of the indicator circuit section 250. In the indicator circuit section 250, numerals 252, 253, 254 and 255 designate resistors for producing reference voltages, 256, 257 and 258 comparators for comparing the output voltage of the detector circuit section 200 with the reference voltages provided by the resistors 252, 253, 254 and 255, 259, 260 and 261 resistors, 262, 263 and 266 drive transistors, 267, 268 and 269 liquid level indicator lamps.

Figure 7:
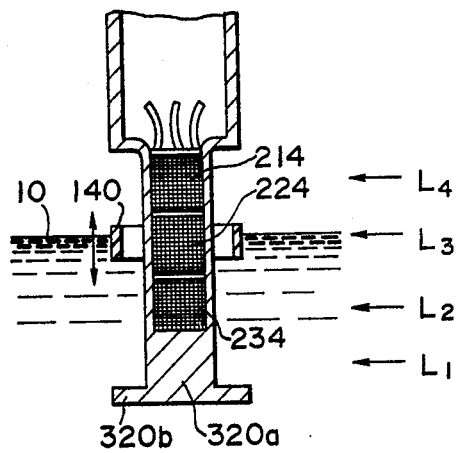
FIG. 7 is a sectional view showing the liquid level detecting part of the embodiment shown in FIG. 6.

FIG. 7 is a sectional view of the liquid level detecting part of the second embodiment, which is similar in construction with the counterpart shown in FIG. 2 except that a support 320a accommodates therein the respective coils 214, 224 and 234 of the ring oscillators 210, 220 and 230. The float 140 is prevented from coming off the support 320a by means of a stopper 320b.

With the construction described above, the operation of the second embodiment is as follows. When the liquid 10 reaches the liquid level $L_1$ as shown in FIG. 7, a conductive ring member 32 of the float 140 of the type shown in FIG. 7 does not surround any of the coils 214, 224 and 234 each constituting a component element of the ring oscillators 210, 220 and 230, respectively. Consequently, a self-inductive electromotive force is produced in each coil. Thus, as in the case of the ring oscillator shown in FIG. 4A including the coil L, by virtue of the self-inductive action of the coil, each of the ring oscillators 210, 220 and 230 becomes equivalent to one such as shown in FIG. 4C in which the input of the inverter gate $IC_1$ is connected to the output of the inverter gate $IC_3$ though the delay circuit D and the resulting oscillation frequency $f_1$ is given as $f_1 \approx 1/(3\tau + t)$, where $\tau$ is the delay time in the signal transmission speed of each iverter gate and $t$ is the delay time due to the self-inductive action of the coil. As mentioned previously, the oscillation frequency $f_1$ of the ring oscillators 210, 220 and 230 is about 300 kHz (hereinafter referred to as a low frequency).

On the other hand, when the level of the liquid 10 reaches the level $L_2$, the float 140 surrounds the coil 234 only, so that the conductive ring member 32 of the float 140 is magnetically coupled to the coil 234 and thus the self-inductive electromotive force induced in the coil 234 is absorbed by the onductive ring member 32. In this case, the ring oscillator 230 becomes equivalent to the ordinary ring oscillator such as shown in FIG. 4B in which the input of the inverter gate $IC_1$ and the output of the inverter gate $IC_3$ are short-circuited and the resulting oscillation frequency $f_1$ is given as $f_2 \approx \frac{1}{3}\tau$ as mentioned previously. In the case of this embodiment, as mentioned previously, the oscillation frequency $f_2$ is about 6,000 kHz (hereinafter referred to as a high frequency). Since the coils 214 and 224 of the other ring oscillators 210 and 220 are not surrounded by the float 140, these oscillators oscillate at about 300 kHz as mentioned previously.

It will thus be seen that when the liquid level reaches the level $L_3$, the float 140 surrounds the coil 224 only so that in the same manner as mentioned previously the ring oscillator 220 oscillates at the high frequency and the other ring oscillators 210 and 230 oscillate at the low frequency, whereas when the liquid level reaches the level $L_4$, only the ring oscillator 210 oscillates at the high frequency and the other ring oscillators 220 and 230 oscillate at the low frequency.

In the case of this embodiment, the ratio between the power consumption $f_1$ of the ring oscillator whose coil is surrounded by the float 140 and that of the ring oscillator whose coil is not surrounded by the float 140 is given as $f_1 : f_2 \approx 10 : 1$ as mentioned previously. This means that if $Z[\Omega]$ represents the impedance, as looked from the power source, of the ring oscillator whose coil is surrounded by the float 140, then the impedance of the ring oscillator whose coil is not surrounded by the float 140 is $10\ Z[\Omega]$.

Figure 8A:
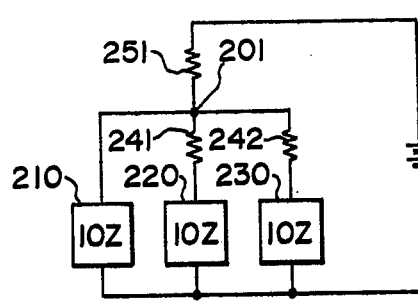
FIGS. 8A and 8B are circuit diagrams useful for explaining the operation of the embodiment shown in FIG. 6.
Figure 8B:
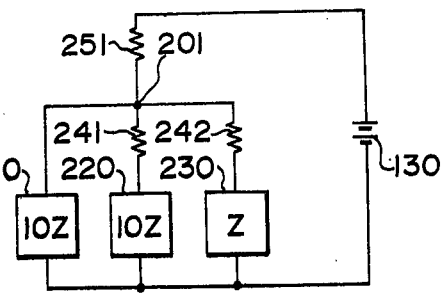
Figure 6:
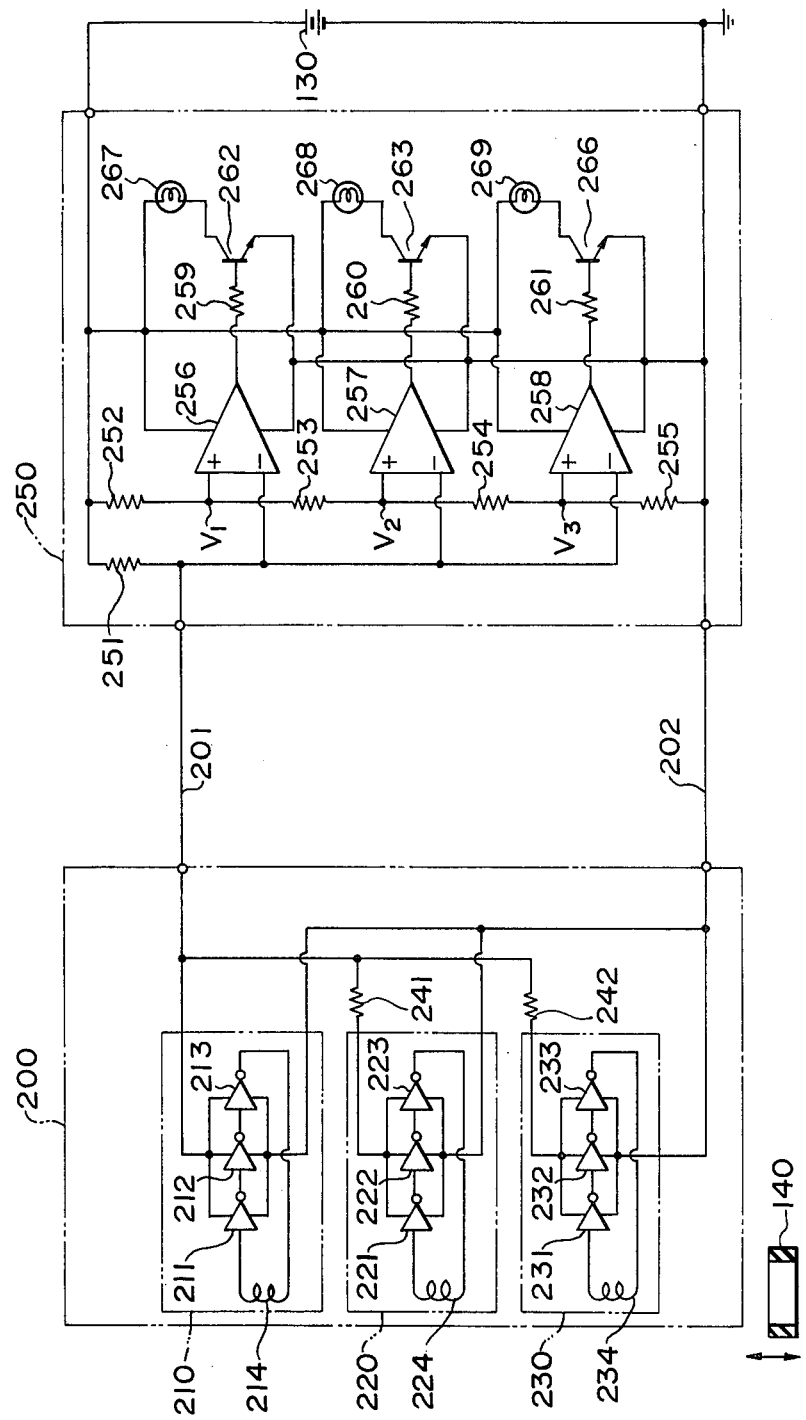
FIG. 6 is a wiring diagram showing another embodiment of the invention.

It will thus be seen from the foregoing that when the liquid level is at $L_1$, the detector circuit section 200 of FIG. 6 may be represented by a circuit in which each of the ring oscillators 210, 220 and 230 has an impedance of $10\ Z[\Omega]$ as shown in FIG. 8A. In this case, the voltage on a line 201 is represented as $V_1$. When the liquid level is at $L_2$, as mentioned previously, the float 140 surrounds only the coil 234 of the ring oscillator 230 and consequently only the impedance of this ring oscillator becomes $Z[\Omega]$ as indicated in the circuit shown in FIG. 8B. The resulting voltage $V_2$ on the line 201 is lower than the voltage $V_1$ (the calculating formula is not shown). When the liquid level reaches $L_3$, only the impedance of the ring oscillator 220 becomes $Z[\Omega]$. Let is be assumed that $R_1[\Omega]$ and $R_2[\Omega]$ represent respectively the resistance values of the resistors 241 and 242 of the ring oscillators 220 and 230 which are connected to the power source 130 and the relative magnitude therebetween is such that $R_1 < R_2$. Then, the resulting voltage $V_3$ on the line 201 is lower than the voltage $V_2$. It will thus be seen that when the liquid level reaches $L_4$, the resulting voltage $V_4$ on the line 201 is lower than the voltage $V_3$. In other word, on the line 201 of FIG. 6 is produced a voltage signal which is varied in accordance with changes in the level of the liquid 10. This voltage signal is applied to the inverting input terminals of the comparators 256, 257 and 258 in the indicator circuit section 250 of FIG. 6. The noninverting input terminals of the comparators 256, 257 and 258 respectively receive reference voltages $v_1$, $v_2$ and $v_3$ produced by the resistors 252, 253, 254 and 255 for the purpose of detecting the voltage signal. The relationship between the reference voltages $v_1$, $v_2$ and $v_3$ and the voltages $V_1$, $V_2$, $V_3$ and $V_4$ produced on the line 201 in response to the change of the liquid level to $L_1$, $L_2$, $L_3$ and $L_4$, respectively, is so selected that $V_1 > v_1 > V_2 > v_2 > V_3 > v_3 > V_4$. Thus, when the level of the liquid 10 is at $L_1$, since the voltage on the line 201 is $V_1$ as mentioned previously, the output signals of the comparators 256, 257 and 258 all go to "0", so that the transistors 262, 263 and 266 are turned off altogether and all the indicator lamps 267, 268 and 269 are not turned on. Then, as the level of the liquid 10 reaches $L_2$, the voltage on the line 201 decreases to $V_2$ so that only the output signal of the comparator 256 goes to "1" and the transistor 262 is turned on, thus causing the indicator lamp 267 to go on. When the level of the liquid 10 reaches $L_3$, the output signals of the comparators 256 and 257 go to "1" and the indicator lamps 267 and 268 are lighted. When the level of the liquid 10 reaches $L_4$, all of the indicator lamps 267, 268 and 269 are lighted. In this way, the multilevel detection of the level of the liquid 10 can be accomplished.

While, in the above-described embodiment, the level of the liquid 10 is detected at three different levels, it is possible to detect the level of the liquid 10 at a greater number of levels by increasing the number of ring oscillators each including a coil.

What is claimed is:

1. A liquid level detecting apparatus comprising:
   a d.c. power source;
   at least one ring oscillator connected to said source and energized by a direct current therefrom for generating an oscillation signal, said ring oscillator including a coil to be placed in a liquid for varying the frequency of the oscillation signal in accordance wih a self-inductive electromotive force induced therein, and the electric power consumed by said ring oscillator corresponding to the frequency of the oscillation signal;
   a float disposed around said coil for vertically moving in accordance with level changes of said liquid, said float including a metallic portion for absorbing said electromotive force only while said float is near to said coil to be magnetically coupled thereto;
   a resistor connected between said power source and said ring oscillator, for generating thereacross a voltage signal proportional to the direct current flowing from the former to the latter;
   comparison means connected to said resistor, for comparing said voltage signal with a predetermined value which corresponds to predetermined power consumption of said oscillator to generate an output signal when said voltage signal coincides with said predetermined value; and
   indicator means connected to said comparison means, for giving an indication in response to the output signal of said comparison means.

2. A liquid level detecting apparatus according to claim 1, wherein said ring oscillator comprises:
   an odd number of inverter gates connected in series with each other, said coil being connected between an output terminal of the inverter gate at the last stage and an input terminal of the inverter gate at the first stage.

3. A liquid level detecting apparatus according to claim 1, wherein said float comprises an outer ring made of non-conductive material and said metallic portion forms an inner ring.

4. A liquid level detecting apparatus according to claim 1, wherein said comparison means comprises:
   at least one transistor, connected to be responsive to said voltage signal generated across said resistor, for controlling energization of said indicator.

5. A liquid level detecting apparatus comprising:
   a d.c. power source;
   a plurality of ring oscillators, each thereof connected to and energized by said power source for generating an oscillation signal, said oscillators including respective coils vertically stacked on each other, each thereof for varying the frequency of each oscillation signal in accordance with a self-inductive electromotive force induced therein, and power consumed by each oscillator corresponding to the frequency of each oscillation signal;

a float disposed around said coils for vertically moving in accordance with level changes of said liquid, said float including a metallic portion for absorbing one of said electromotive forces only while said float is near to respective one of said coils to be magnetically coupled thereto;

a resistor connected between said power source and said ring oscillators, for generating a voltage signal proportional to the sum of the direct currents flowing from said power source to said oscillators;

a plurality of comparators connected to said resistor, each thereof for comparing said voltage signal with each predetermined value which corresponds to each level of the liquid to generate an output signal when said voltage signal coincides with each predetermined value; and a plurality of lamps connected to said comparators, respectively, each thereof for giving an indication in response to the output signal of each comparator.

* * * * *